(12) United States Patent
Fishteyn et al.

(10) Patent No.: US 7,649,838 B2
(45) Date of Patent: Jan. 19, 2010

(54) SYSTEM AND METHOD FOR RANKING THE QUALITY OF INTERNET TRAFFIC DIRECTED FROM ONE WEB SITE TO ANOTHER

(75) Inventors: Daniil Fishteyn, Millington, NJ (US); Dmitry Korsunsky, East Brunswick, NJ (US); William K. Loss, Asbury, NJ (US)

(73) Assignee: Adknowledge, Inc., Kansas City, MO (US)

( * ) Notice: Subject to any disclaimer, the term of this patent is extended or adjusted under 35 U.S.C. 154(b) by 612 days.

(21) Appl. No.: 10/801,199

(22) Filed: Mar. 16, 2004

(65) Prior Publication Data

US 2004/0190448 A1 Sep. 30, 2004

Related U.S. Application Data

(60) Provisional application No. 60/459,135, filed on Mar. 31, 2003, provisional application No. 60/467,713, filed on May 2, 2003.

(51) Int. Cl.
*H04L 12/26* (2006.01)
(52) U.S. Cl. .......................... 370/229; 370/235; 709/224
(58) Field of Classification Search ................. 370/229, 370/230, 230.1, 233, 235, 395.21; 709/223, 709/224
See application file for complete search history.

(56) References Cited

U.S. PATENT DOCUMENTS

| 6,269,361 | B1 | 7/2001 | Davis et al. | |
|---|---|---|---|---|
| 7,363,254 | B2* | 4/2008 | Skinner | 705/26 |
| 2002/0186237 | A1* | 12/2002 | Bradley et al. | 345/736 |
| 2003/0014331 | A1* | 1/2003 | Simons | 705/27 |
| 2003/0028529 | A1* | 2/2003 | Cheung et al. | 707/3 |
| 2003/0028617 | A1* | 2/2003 | Taylor | 709/217 |
| 2003/0149938 | A1* | 8/2003 | McElfresh et al. | 715/517 |
| 2003/0208578 | A1* | 11/2003 | Taraborelli et al. | 709/223 |
| 2003/0208594 | A1* | 11/2003 | Muret et al. | 709/224 |
| 2004/0019688 | A1* | 1/2004 | Nickerson et al. | 709/229 |
| 2004/0044571 | A1* | 3/2004 | Bronnimann et al. | 705/14 |
| 2004/0139192 | A1* | 7/2004 | Spaid | 709/224 |
| 2004/0260807 | A1* | 12/2004 | Glommen et al. | 709/224 |
| 2006/0036400 | A1* | 2/2006 | Kasriel et al. | 702/182 |
| 2006/0070117 | A1* | 3/2006 | Spalink et al. | 726/3 |

* cited by examiner

*Primary Examiner*—Kwang B Yao
*Assistant Examiner*—Nguyen Ngo
(74) *Attorney, Agent, or Firm*—Mendelsohn, Drucker & Associates, P.C.; Jerome R. Smith, Jr.; Steve Mendelsohn

(57) ABSTRACT

A system and method of determining a quality ranking of user traffic directed from at least one traffic producer Web site to a traffic consumer Web site. A reference for the traffic consumer is established on a Web site of the traffic producer. The reference includes a link from the traffic producer to a traffic quality intermediary and a unique identifier to identify the traffic consumer. The traffic quality intermediary receives user traffic data associated with the user traffic directed from the traffic producer and determines a quality ranking of the user traffic based upon the user traffic data.

6 Claims, 8 Drawing Sheets

22

```
┌─────────────────────────────────┐
│  SET A BASELINE VALUE FOR EACH  │ 44
│  TRAFFIC DATA PARAMETER BASED ON│
│  HISTORY OR ASSESSMENT OF EACH  │
│     TRAFFIC DATA PARAMETER      │
└─────────────────────────────────┘

┌─────────────────────────────────┐
│    AGGREGATE USER TRAFFIC DATA  │ 45
└─────────────────────────────────┘

┌─────────────────────────────────┐
│      COMPARE EACH TRAFFIC DATA  │
│  PARAMETER FROM A USER'S TRAFFIC│ 46
│  DATA AGAINST THE CORRESPONDING │
│   BASELINE VALUE AND DETERMINE  │
│         A DEVIATION VALUE       │
└─────────────────────────────────┘

┌─────────────────────────────────┐
│      NORMALIZE DEVIATION VALVES │ 47
└─────────────────────────────────┘

┌─────────────────────────────────┐
│    SET A BASELINE WEIGHT FOR EACH│ 48
│       TRAFFIC DATA PARAMETER    │
└─────────────────────────────────┘

┌─────────────────────────────────┐
│      MULTIPLY EACH TRAFFIC DATA │
│    PARAMETER BY EACH RESPECTIVE │
│   DEVIATION VALUE AND THEN BY EACH│ 50
│   BASELINE WEIGHT TO DETERMINE A│
│     RANKING FOR EACH TRAFFIC DATA│
│            PARAMETER            │
└─────────────────────────────────┘

┌─────────────────────────────────┐
│   ADD EACH RANKING FOR EACH TRAFFIC│
│    DATA PARAMETER TO DETERMINE A│ 52
│   QUALITY RANKING FOR A PARTICULAR│
│           USER TRAFFIC          │
└─────────────────────────────────┘
```

FIG.8

SYSTEM AND METHOD FOR RANKING THE QUALITY OF INTERNET TRAFFIC DIRECTED FROM ONE WEB SITE TO ANOTHER

RELATED APPLICATION

This application claims the benefit of priority to U.S. Provisional Patent Application No. 60/459,135, filed on Mar. 31, 2003, and U.S. Provisional Patent Application No. 60/467,713, filed on May 2, 2003, the contents of which are incorporated in this application by reference.

FIELD OF THE INVENTION

The present invention relates to Internet traffic between Web sites and more specifically, to a system and method for ranking the quality of user traffic that is directed from one Web site to another Web site.

BACKGROUND OF THE INVENTION

The advent of the Internet has resulted in an incredible amount of information accessible to any computing device connected to this vast global communication network. In addition to allowing access to this information, the Internet provides a means for communicating and conducting business from any location with a connected computer. The Internet does not have geographic boundaries and is not limited to a particular language or type of computer software/equipment. This allows users from all over the world to search, communicate and transact business.

The World Wide Web (abbreviated as "WWW" and often referred to as "the Web") is a distributed, multimedia, hypertext system. It allows users access to information on the Internet using the HyperText Transfer Protocol (HTTP) to transmit information, browsers to present this information to Web users who search or surf the Web and Web servers to retrieve the information and serve it to the browsers.

HTTP is one of the three components of the Web protocol and is a set of rules and parameters for computers to communicate over the Web. The HyperText Markup Language (HTML) and Universal Resource Locators (URL's) are the other two components of the original Web protocol. HTTP defines how information should be formatted and transmitted and also describes how browsers and Web servers communicate between one another. The HTTP standard continues to evolve and offer new capabilities in information exchange over the Web.

Information is transferred over the Web in the form of Web documents (also referred to as "Web resources" or "Web pages"). A Web page is a document created using the HyperText Markup Language (HTML) and has a unique address on the Web referenced by its URL. Web pages often contain hypertext or hyperlinks that provides a user with the ability to click on the hyperlinked text or graphics and immediately be transferred to the unique destination associated with the hyperlink. Web pages may contain multimedia elements such as text, sound, graphics and videos. While HTML is the original markup language in the Web protocol that defines the Web, other markup languages have been and are being developed for communicating over the Web. HTML is thus an evolving computer language describing how Web pages should be formatted and displayed on a user's screen.

A URL is a unique address for a specific resource or destination on the Internet and consists of the name of the protocol used to retrieve a document and the address of the computer or computers containing the Web page. It may also contain the name of a Web document itself.

Browsers, such as Microsoft Internet Explorer™ and Netscape Navigator™, are referred to as Web clients and communicate with Web servers via HTTP to request Web documents from the Web, format received Web pages and ultimately display them to the Internet users on their computer screen.

Web servers are computers running Web server programs, which handle requests from users on the Web to retrieve information referenced at a specific URL on the Web. After receiving the request, the Web server returns HTML formatted Web documents back to the requestor.

Web pages may contain HyperText URL links, or hyperlinks, to other Web pages or may themselves be presented to the user in a form of specially formatted text or graphics. When a user clicks on a hyperlink, a browser immediately requests and displays the Web page referenced in the link. This process is commonly known as hyperlinking.

One or more Web pages located in the same address on the Internet constitute a Web site. A main Web page of a Web site is typically referred to as the home page and can be configured to be accessed without specific mention of the full file name. For example, the Web site for IBM™ has the home page address of http://www.ibm.com. The home page address actually includes a specific file name such as index.html but, as in IBM's case, when a standard default name is set up, users do not have to enter the full file name. Web sites are owned and maintained by individuals, companies or organizations.

With a wealth of information available on the Internet opportunities for transacting business have opened up and continue to grow. Increasing numbers of Internet users have Web sites where information, products and services are searched for, bought and sold. The vastness of the information available on the Web has made it necessary to find ways of allowing Web users (Web surfers) to find Web sites that may be of interest to them.

Search engines, directories, portals and other resources are examples of Web sites created to assist Internet users in locating desired information on the Web. Such resources search for and collect links to Web sites and then store those links based on sets of keywords that may be relevant to the Web sites. One of the ways Web users may locate a needed Web site is by conducting a search on one of these search resources. A search is conducted by entering keywords through a search engines' or directories' Web site, obtaining a list of links to the relevant Web pages that were found in the keyword search, selecting a link by clicking on any of the links, and being redirected to a Web site whose link was clicked. A Web user may also navigate directly to a desired Web page, without the use of a search resource, by typing a URL into the address field of a browser.

The process of a Web user accessing a Web site is referred to as a "Web site visit." The result of one or more Web users visiting a Web site by clicking a link on another Web site is user traffic between the Web sites. A high number of distinct Web users navigating from one Web site to another is referred to as "high user traffic."

While some Web users visit or browse Web sites merely looking for information, some Web users visiting a Web site of an online company may choose to conduct business with that Web site. Generally, online businesses are interested in obtaining high user traffic because it is often believed that higher user traffic leads to higher sales and increased revenues.

Online companies that, by virtue of their business model, encourage Web users to navigate from their Web site(s) to other Web sites are referred to as "traffic producers." Online companies that seek to attract Web users are called "traffic consumers." An online book store is an example of a traffic consumer because it seeks to attract Web users. An Internet directory is an example of a traffic producer, because its business is to redirect Web site visitors to other Web sites such as an online bookstore. Millions of Web sites produce and/or consume user traffic every day.

FIG. 2 illustrates a typical Web user traffic flow environment with traffic consumers 210 receiving user traffic 214 from traffic producers 212. Traffic consumers 210 are the business Web sites of specific businesses promoting and/or selling products and/or services over the Internet. Examples of traffic consumers 210 illustrated in FIG. 2 are a gift Web site, an insurance reseller Web site and an online bookstore Web site. This is meant to be exemplary and not exhaustive of the many traffic consumers that exist on the Internet Web.

Traffic producer Web sites 212 are search engines, search portals, Internet directories or other Web sites from which user traffic is directed to a traffic consumer 210. Some traffic producers 212 actually play a dual role by attracting Web users 214 through a general or industry specific portal and then redirecting those same Web users 214 to other traffic producers 212 with more specific content. In that scenario, the traffic producer 212 with more specific content becomes a traffic consumer before switching its role to a traffic producer. Similarly, some traffic consumers 210 play a dual role of receiving traffic, but also redirecting user traffic to other traffic consumers 210.

Traffic consumers use various advertising techniques to obtain user traffic. Web-based advertisements come in various forms and include as examples, banners, pop-ups, paid references/listings and prominent placements on the traffic producers Web sites. Links to the traffic consumer that placed the advertisement are typically embedded in the advertisements. Web users are redirected to the traffic consumer Web site after clicking on an advertisement. Traffic consumers use various payment techniques to compensate traffic producers for placement of the advertisements and use of their Web site resources. Featuring of advertisements is one of the common ways for traffic producers to earn revenue. Traffic consumers are interested in having their advertisement appear on multiple traffic producers' Web sites to increase their exposure to Web users.

One method of Internet advertising for traffic consumers is the Pay Per Click (PPC) business model. In this model, a traffic consumer creates an advertising listing consisting of a title, description, link, and set of keywords corresponding to its Web site's focus. The traffic consumer submits the listing to the PPC search engine and selects a bid amount for each keyword. The PPC search engine features the listing for that traffic consumer along with the listings of other traffic consumers in the order of the bid amount each has selected in the results Web page when Web user searches for the bidded keyword. The higher the bid, the better the placement position of the traffic consumer's hyperlinked listing compared to the other listings with the same keywords. A Web user may click on any of the displayed listings and would get redirected to the Web site of the appropriate traffic consumer. Once a Web user clicks on a listing, the amount equal to the bidded amount for the keyword is deducted from traffic consumer's account and applied to the PPC search engine account. PPC search engines may also feature a traffic consumer's listings on the sites of its affiliate traffic producers producing even greater exposure for the traffic consumer. An example of a PPC business model is described in U.S. Pat. No. 6,269,361 to Davis, et al.

For advertising models that generate revenue for the traffic producer based on the number of users that select the advertisement, there is a clear monetary benefit for traffic producers to send as much user traffic as possible to traffic consumers. For this reason, some traffic producers may use dishonest means to generate user traffic from the traffic producer's Web site to the traffic consumer's Web site. For example, a traffic producer may offer a reward to a Web user for clicking on a traffic consumer's listing repeatedly, initiate a Web site visit on the Web users' behalf or even use a computer program to simulate Web users clicking on the traffic consumer's listing. While there is no business benefit to this type of incentified and fictitious user traffic, advertising fees would still be due from the traffic consumer. Thus, there is no guarantee that each unique Web site visit from a traffic producer will deliver the same business value to the traffic consumer. In general, each traffic producer generates user traffic of different quality from the perspective of the traffic consumer.

There exist a number of software systems, which try to measure the business value of the user traffic by comparing the amount of new business to the amount invested. This measurement is also known as Return on Investment (ROI) figure. Web users are tracked throughout their visit on the traffic consumer's Web site and the amount of money spent by them to purchase products or services is correlated to the amount spent to get them to visit the Web site.

While useful in some industries, this measurement does not have much value in other industries with long selling cycles such as the automotive industry. Web users may visit a traffic consumer's Web site as a result of advertising but may come back months later to actually make a purchase. It would be nearly impossible to correlate them to the original visitors who came months earlier. Traffic consumers using ROI analysis may spend months analyzing their Web site visitors without arriving at a clear understanding of which traffic producers have been sending them the best user traffic. Another shortcoming of ROI analysis is that it is focused on analyzing user behavior on the traffic consumer's Web site and cannot address the issue of evaluating the user online activity pattern on the traffic producer's Web sites.

Even though ROI and other measurements are useful for some online businesses, advanced programming capabilities or third party analytical software as well as long data collection periods are necessary to collect enough data for analysis to be successful. Many traffic consumers may not have the benefit of both.

No known system or method exists to assist a traffic consumer in quantifying the quality of user traffic received from a specific traffic producer. Merely knowing from which site user traffic is generated does not provide information regarding the quality of that traffic to a business-it does not quantify the likelihood that the user traffic is human generated, comes from Web users interested in the traffic consumer's wares and is relevant to the traffic consumer's line of business. With this user traffic quality information currently lacking in existing systems, a traffic consumer does not have the ability to adequately assess where to advertise, the type of advertising to place and how much to pay for the advertising.

SUMMARY OF THE INVENTION

The present invention involves a system and method of determining a quality ranking of user traffic directed from at least one traffic producer Web site to a traffic consumer Web site. A reference for the traffic consumer is established on a Web site of the traffic producer. The reference includes a link from the traffic producer to a traffic quality intermediary and a unique identifier to identify the traffic consumer. The traffic quality intermediary receives user traffic data associated with the user traffic directed from the traffic producer and determines a quality ranking of the user traffic based upon the user traffic data.

An additional step includes redirecting the user traffic to the traffic consumer Web site that was originally selected by the user, after the user traffic is directed to the traffic quality intermediary.

A still further step includes reporting the quality ranking to the traffic consumer.

In one embodiment, the step of determining a quality ranking involves comparing each of the plurality of traffic data parameters that make up the user traffic data against a baseline group. The baseline group is comprised of a respective baseline for each of the user traffic data parameters. A deviation is then determined for each of the plurality of traffic data parameters of the user traffic based on the comparison. The deviations for each of the plurality of traffic data parameters are weighted with a predetermined weight assigned to each of the plurality of traffic data parameters. The weighted deviations are then combined to arrive at the traffic quality ranking.

In still another embodiment, at least one traffic data parameter of the user traffic data is aggregated, before the user traffic data is compared against a baseline. Once the aggregated user traffic data is used in determining the deviations, the deviations are normalized to fit the same standard and the quality ranking is determined based upon the normalized user traffic.

BRIEF DESCRIPTION OF THE DRAWINGS

The present invention will not be described by way of non-limiting example, with reference to the attached drawings in which:

FIG. 8 is a flow diagram of exemplary steps for determining a quality ranking, in accordance with the present invention.

DETAILED DESCRIPTION OF THE INVENTION

The system and method of the present invention monitors user traffic between traffic producers and traffic consumers to quantify the quality of the user traffic and detect fraud. In order to quantify the quality of user traffic, various parameters are identified, weighted and compared against baselines values established for these parameters. The baseline values are created as a result of collecting and analyzing traffic data from other Web sites. The quality ranking information that results from the present invention is provided to a traffic consumer to help quantify the overall quality of each traffic producer analyzed. The traffic consumer is able to adjust the weighting of the various parameters that make up the individual traffic producer ranking in order to better correlate the quality ranking to more closely reflect the traffic consumer's line of business.

The present invention acts as an intermediary or monitor between traffic producers and traffic consumers by collecting information about user traffic traversing between these entities. The collected information is then analyzed and ranked against one or more established baselines for the various parameters. As more information becomes available, the baseline parameters are adjusted to the changing conditions of the specific industry, for example, to more accurately reflect traffic quality for that segment. Traffic consumers would not have to wait weeks or months to collect and analyze traffic data from a traffic producer to determine the likelihood of conversions (sales) from an advertising investment. Rankings can be produced to assess and compare the quality of a specific traffic producer's traffic against one or more baselines, such as, traffic producers within related industries, overall Web ranking data if no segment/industry information is available, and ranking data against traffic producer's previous performance if sufficient data is present.

Figure 1:
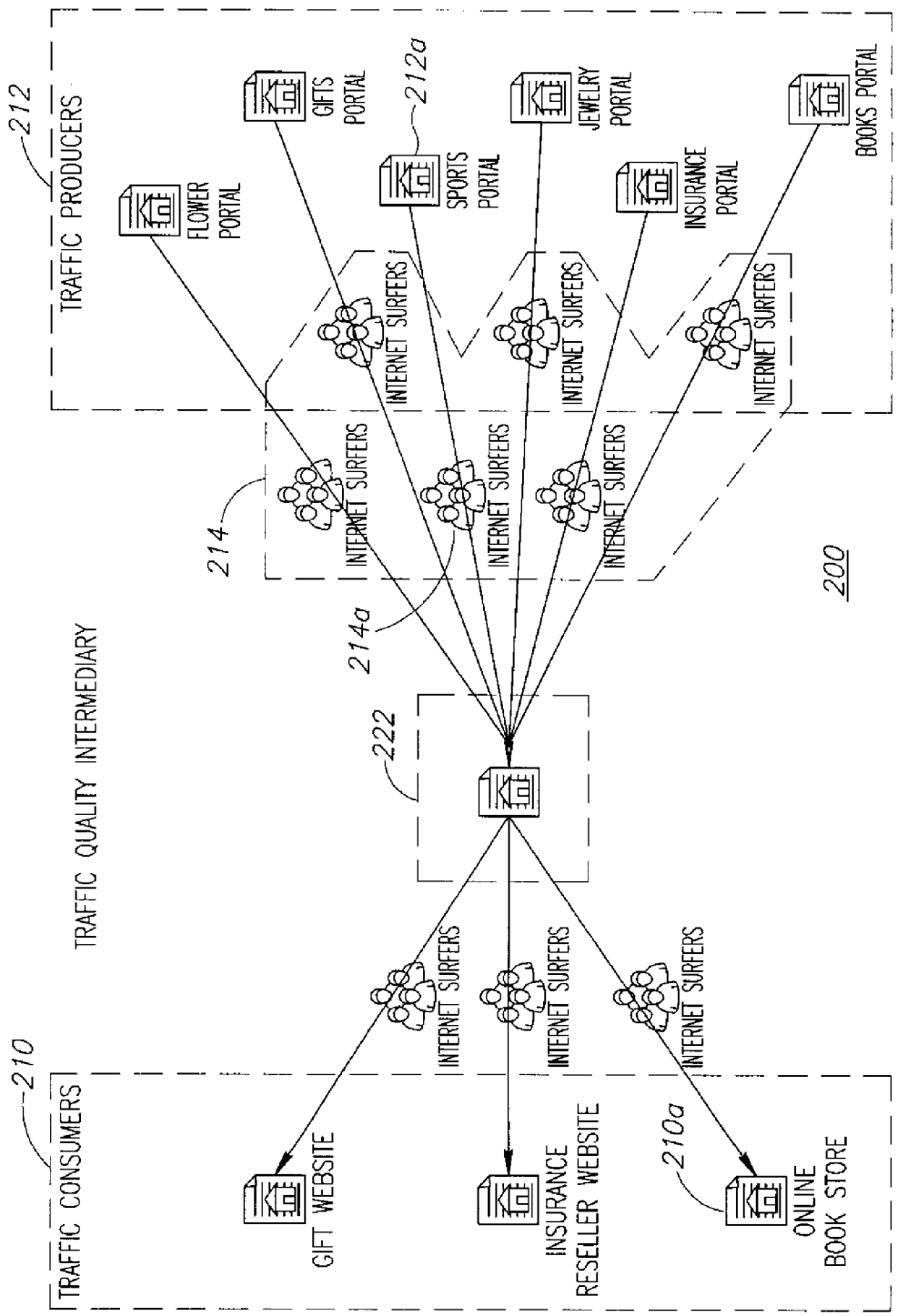
FIG. 1 is diagram showing an overview of the system in accordance with the present invention.
Figure 2:
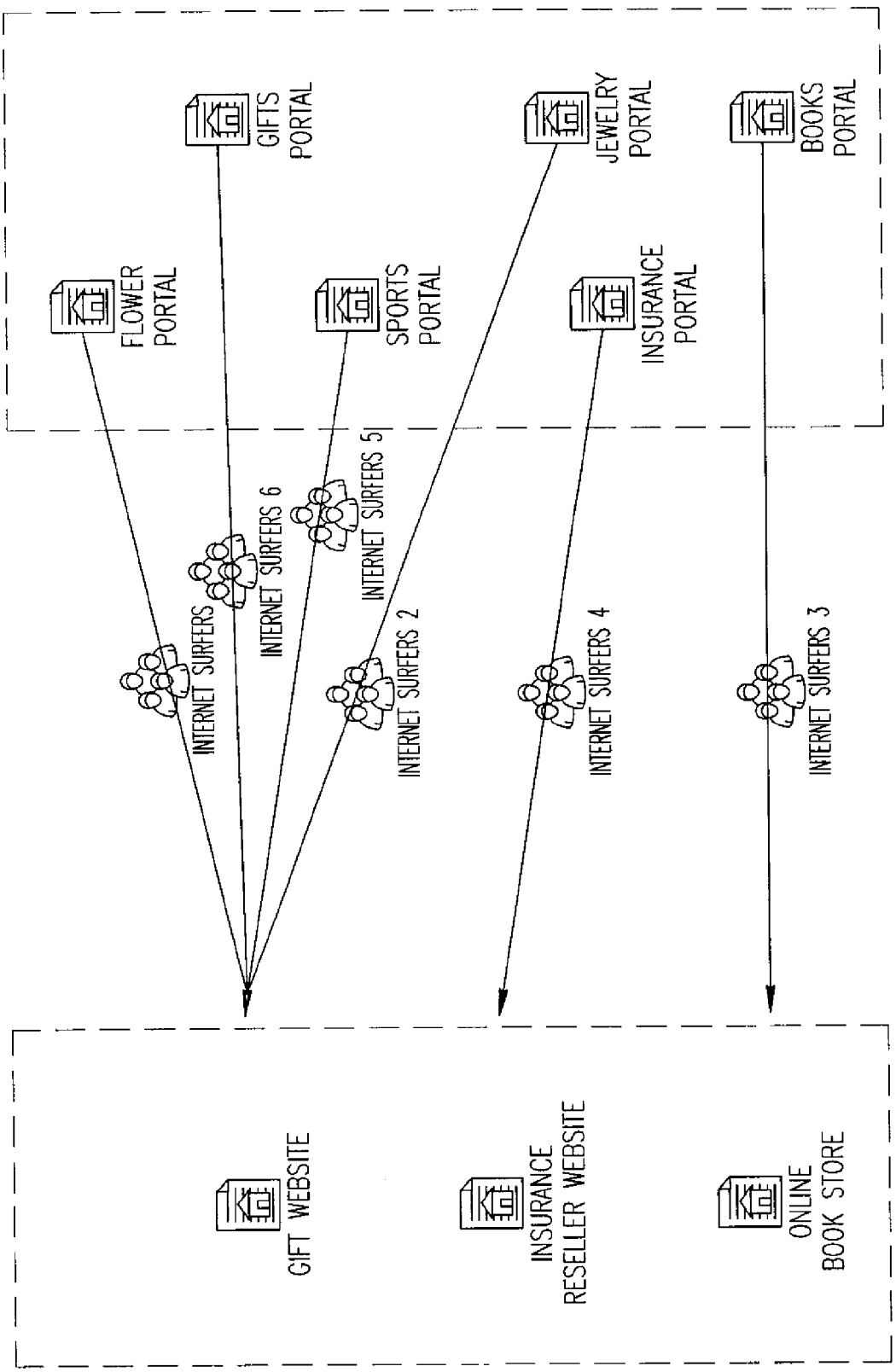
FIG. 2 is an illustration of the prior art.

There is shown in FIG. 1 a traffic quality ranking system 200. Traffic quality ranking system 200 uses a traffic quality intermediary (or traffic quality monitor) 222 positioned to intercept user traffic 214 directed from traffic producers 212 to traffic consumers 210. Traffic quality intermediary 222 collects and analyzes user traffic from traffic producers 212, and reports on the quality of user traffic from each traffic producer 212 to each traffic consumer 210. Traffic quality intermediary 222 determines the quality of user traffic between specific traffic producers 212 and specific traffic consumers 210 by measuring the traffic against established baseline values to arrive at a traffic quality ranking. An example of a specific traffic producer 212 is sports portal 212a. A specific example of a traffic consumer 210 is online bookstore 210a. If online bookstore 210a has engaged traffic quality intermediary 222 to evaluate user traffic from sports portal 212a, traffic quality intermediary 222 will collect and analyze the user traffic from sports portal 212a and report on the quality of the user traffic with a quality ranking.

In an exemplary embodiment, the analysis results in several quality rankings, comparing the actual user traffic 214a from sports portal 212a against baseline traffic for sports portal 212a, baseline traffic for the industry in which sports portal 212a is defined and a baseline of general Web traffic. Baseline adjustments may be made to accommodate changing user traffic conditions occurring in a particular industry to more accurately reflect traffic quality for that industry. Other baselines can be established and used as may be desired to provide useful information to a traffic consumer 210. For example, an industry of sports traffic producers may be limited to multiple, different sports portals or may be broader, including any portal that sells or promotes any sports related merchandise/services. In an alternative embodiment, baselines may also be tailored to certain time periods, such as times of day, seasons or the occurrence of special events. The quality ranking relating to a general Web traffic baseline may be useful when there is no relevant industry data available.

Traffic quality intermediary 222 serves as an intermediary between at least one traffic producer 212 and at least one traffic consumer 210. In an exemplary embodiment, a traffic consumer 210 engages traffic quality intermediary 222 to rank the quality of the traffic it receives from at least one particular traffic producer 212.

As a part of the insertion of traffic quality intermediary between a traffic producer and a traffic consumer, a reference, such as a listing or advertisement for a particular traffic consumer 210, is placed on a particular traffic producer 212. This reference includes a hyperlink to traffic quality intermediary 222 instead of directly to traffic consumer 210. As Web users get redirected from the Web site of a traffic producer 212 to the Web site of a traffic consumer 210, the request arrives at the Web server of traffic quality intermediary 222, based on the hyperlink. This allows traffic quality intermediary 222 to obtain the relevant user traffic data for use in determining a quality ranking.

The process of intercepting the user traffic and collecting the user traffic data is transparent to the Web user. When a request from a traffic producer 212 arrives at the Web server of traffic quality intermediary 222, the available user traffic data associated with the request and the user is collected and stored. Traffic quality intermediary 222 redirects the Web user to the Web site of the requested traffic consumer 210. The Web user is not actually aware that the intermediary step takes place. While collection of the user traffic data may imply the invasion of a Web user's privacy, the information accessed is readily available to traffic consumer 210 through HTTP. In addition, traffic quality intermediary 222 has been authorized by traffic consumer 210 to collect this information on its behalf. From the Web user's prospective, the click on the reference on the Web site of traffic producer 212 takes the user directly to the selected Web site of traffic consumer 210 without any noticeable delay.

Figure 3:
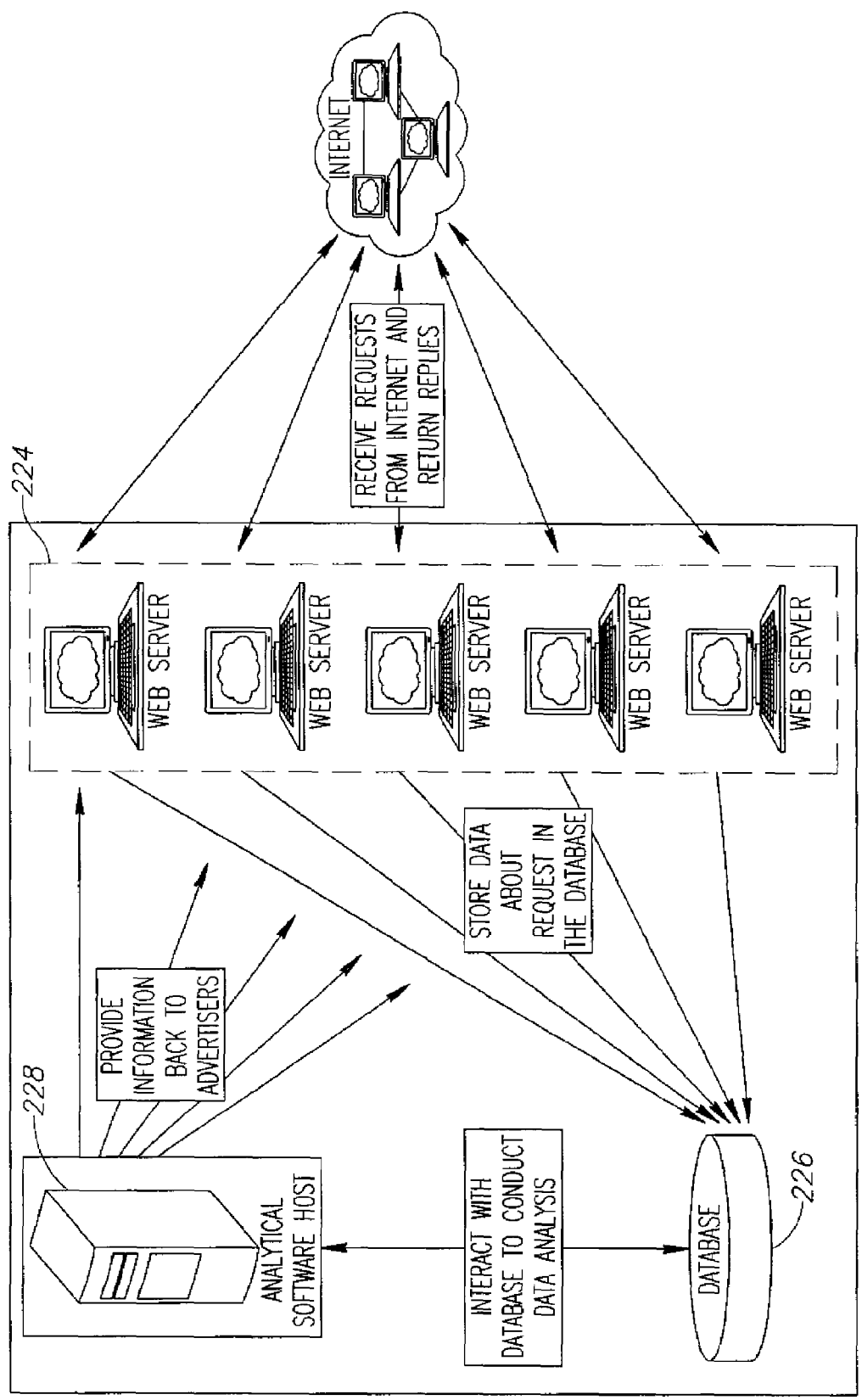
FIG. 3 is a diagram of an exemplary traffic quality intermediary shown in FIG. 1.

There is shown in FIG. 3 an illustration of an exemplary traffic quality intermediary 222. Traffic quality intermediary 222 may consist of one or more Web servers 224. The collected user traffic data is stored in a database 226 which may be located on one or more Web servers 224 or another computer/server (not shown). When a sufficient amount of user traffic data is stored in database 226 or a sufficient time period of collecting user traffic data has lapsed, the user traffic data is analyzed to determine one or more quality rankings of user traffic from a particular traffic producer 212. The analysis of the user traffic data may be done on a separate analysis computer 228 or directly on one or more of the Web servers 224. Analysis computer 228 need not be in the same physical location as Web servers 224. Once the user traffic data is analyzed, the quality ranking(s) is determined and reported to the specific traffic consumer 210 that engaged traffic quality intermediary 222. The quality ranking may be available to the particular traffic consumer 210 through a secure Web site hosted on Web servers 224, communicated in an e-mail or by other secure communication mediums/methods.

In an exemplary embodiment, database 226 is maintained on a dual microprocessor server using 1.4 megahertz Intel™ microprocessors and 2 gigabytes of RAM. An exemplary database server 224 runs Windows 2000™ as its operating system and Microsoft's SQL Server 2000™. Also in an exemplary embodiment, the front-end Web servers 224 are single processor servers using 1.4 megahertz Intel™ processors with 1 gigabyte of RAM. Web servers 224 are running Microsoft IIS JRun version 3.1, a product of Macromedia, Inc. of San Francisco, Calif. As will be understood by those skilled in the art, the present invention is not limited to the hardware or software platform that has been described. The necessary hardware and software platforms allow for communication over the Internet and the Web and are sufficient to collect, store, analyze and report on user traffic data. Such platforms must also allow the capture and then redirecting of a user's requested hyperlink. Many hardware and software platforms have this capability or can be modified to provide these features.

Figure 4:
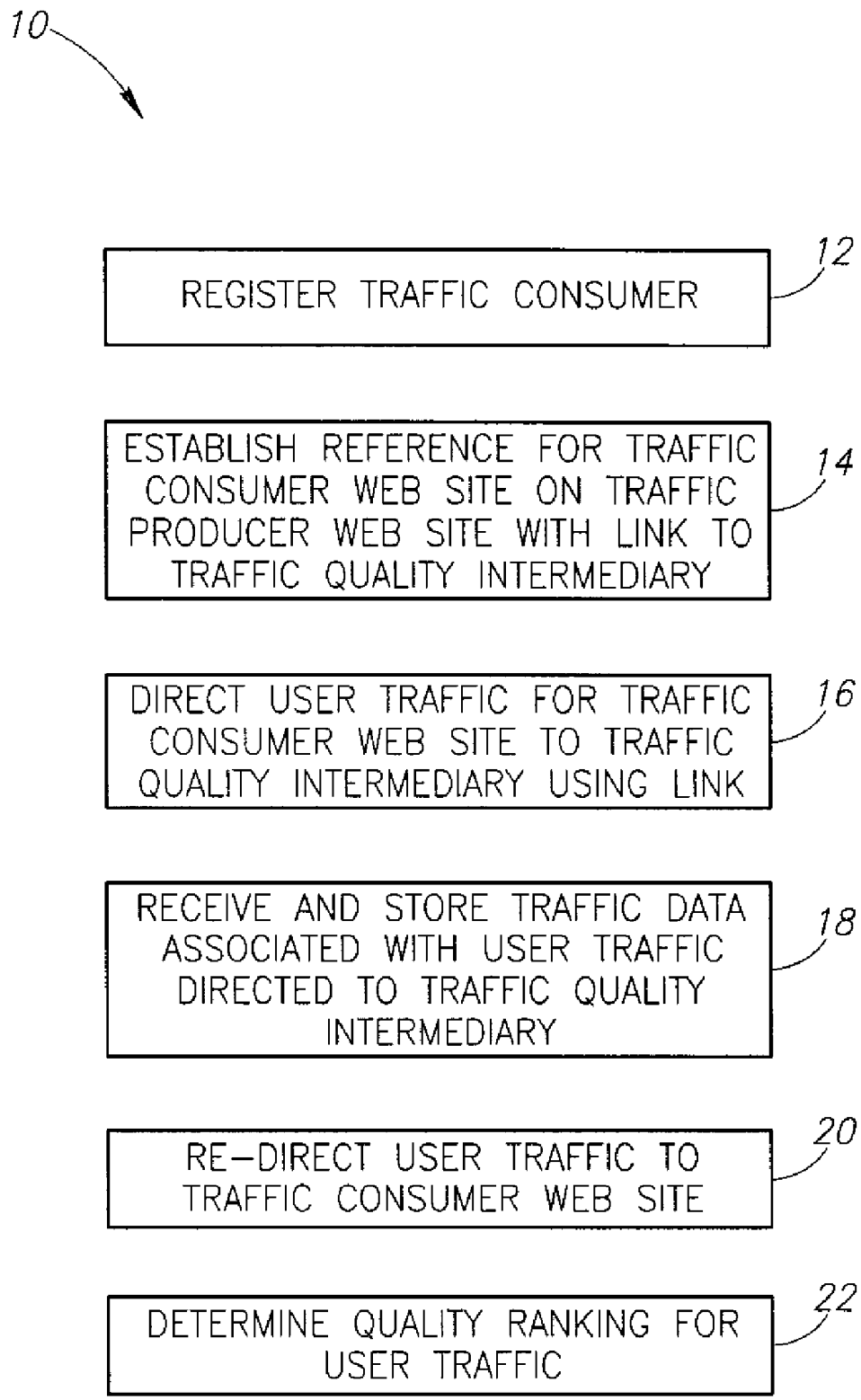
FIG. 4 is a flow diagram of steps involved in the method of the present invention.

There is shown in FIG. 4 a flow diagram 10 illustrating the steps of the methods of the present invention. In block 12, a traffic consumer 210 is registered with traffic quality intermediary 222. Once a traffic consumer 210 is registered, the process moves to block 14 where a reference is placed on the Web site of a traffic producer 212 to point to traffic intermediary 222 and identify traffic consumer 210 as a selection of a user. The process effectively links the reference/listing for a traffic consumer 210 to traffic quality intermediary 222. If there are multiple listings for a traffic consumer 210, each one is linked to traffic quality intermediary 222 with an identifier of traffic consumer 210. When a user accesses or clicks on the listing for traffic consumer 210, the user is directed to traffic quality intermediary 222 by way of a hyperlink associated with the listing for traffic consumer 210. As previously noted, this redirection of user traffic to traffic quality intermediary 222 is transparent to the user. In block 18, the user traffic data associated with the user traffic is received, collected and stored at traffic quality intermediary 222. Next, in block 20, the user is redirected to the Web site of traffic consumer 210 whose listing had been selected by the user. Finally, in block 22 a quality ranking for user traffic directed to traffic consumer 210 from traffic producer 212 is determined so that it can be reported to traffic consumer 210.

Figure 5:
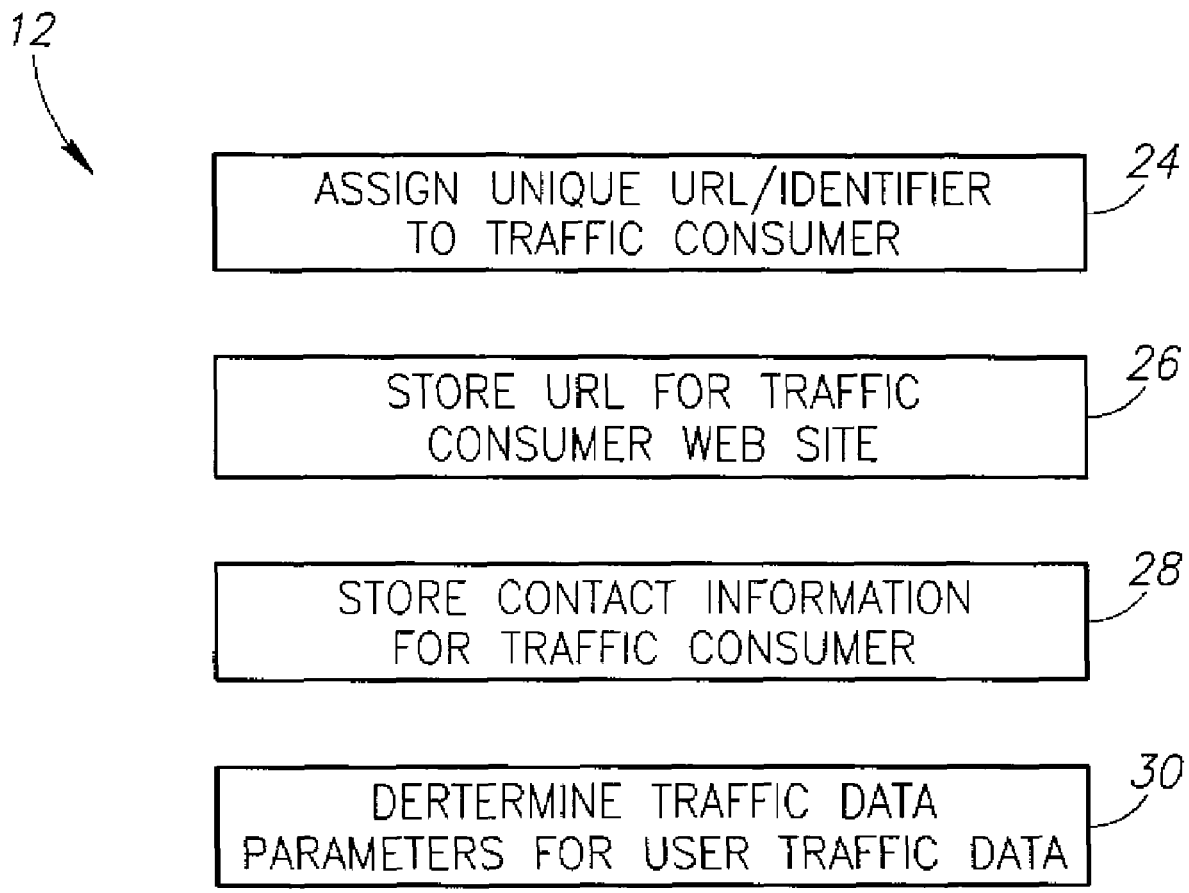
FIG. 5 is a flow diagram of exemplary steps of a registering a traffic consumer in accordance with the present invention.

The exemplary steps of registering a traffic consumer with traffic quality intermediary 222 are shown in more detail in FIG. 5. A traffic consumer must be registered or recognized in some fashion by traffic intermediary 222 in order for the system and method of the present invention to operate. A traffic consumer is not required to register each time the system is used and the method is applied. In block 24 the traffic consumer 210 being registered is assigned a unique URL identifier. Traffic consumer 210 submits one or more URLs associated with the desired references to be placed on a traffic producer 212. Each URL that a traffic consumer registers is assigned a unique URL identifier. The URL identifier may be unique per traffic intermediary system or per traffic consumer. In this way, each listing or URL stored with traffic quality intermediary 222 is unique. The URLs for the Web site of a traffic consumer 210 are stored (block 26) along with any necessary contact information for traffic consumer 210 (block 28). In block 30, the particular traffic data parameters of the user traffic (both intercepted traffic parameters and analyzed/assigned traffic parameters are selected and/or weighted for use in determining the quality ranking of user traffic. It may be that the traffic parameters and/or the weighting are set to defaults and not selected by traffic consumer 210.

In an exemplary embodiment, registering a traffic consumer 210 may involve receiving additional information about the traffic consumer 210. This information includes but is not limited to the name of a contact person for the traffic consumer, specific contact information (address, telephone, e-mail, fax) and the full name of the company. If applicable, a traffic consumer would be able to provide more detailed information on any of the Web sites in that traffic consumer's domain that will be used in the user traffic analysis. It may be necessary for the traffic consumer to provide explicit permission for traffic quality intermediary 222 to set itself up as an intermediary and to collect and route user traffic on behalf of traffic consumer 210. Traffic quality intermediary 222 may also be interested in general information about the online business of traffic consumer 210 to better assess into which industry group/segment traffic consumer 210 fits, as well as the weighting and use of the various traffic data parameters. Information about the traffic consumer's business may also include typical amounts of traffic and the list of traffic producers that the traffic consumer is seeking to evaluate. The selected traffic producers 210 may or may not be in use by traffic consumer 210 at the time it registers with traffic quality intermediary 222. In an exemplary embodiment for secure communications between the traffic consumer and the traffic quality intermediary regarding the traffic quality rankings, a login and password are established. The information provided by the traffic consumer is stored in the database.

Traffic consumer 210 would have to decide who (traffic consumer or traffic quality intermediary) would be accessing traffic producer's Web site to place/modify the link(s) on the traffic consumer's listing to point to traffic intermediary 222. Whoever provides the link must use the appropriate traffic quality intermediary's URL containing the unique traffic consumer's URL identifier to make it possible to locate the traffic consumer's URL and make a redirection to the traffic consumer's Web site (as specified by the URL provided by the traffic consumer). An example of what a linking traffic consumer's URL to a traffic quality intermediary 222 may look like is:

http://www.trafficanalyst.com/index.jsp?urlid=123.

Figure 6:
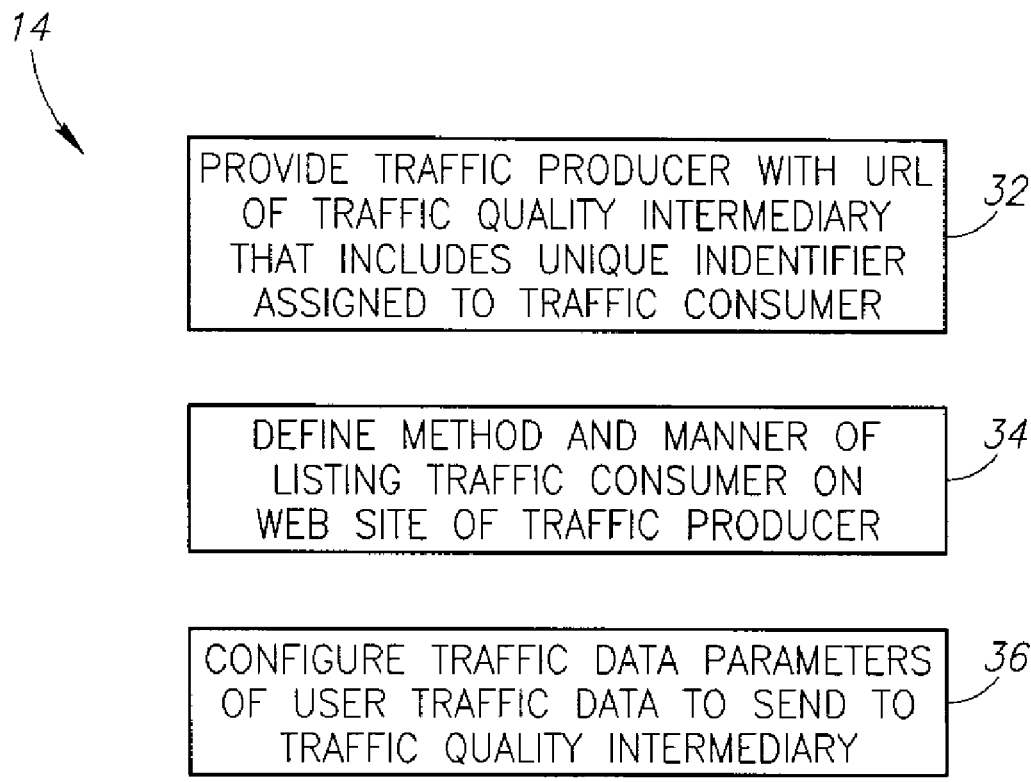
FIG. 6 is a flow diagram of exemplary steps of establishing a reference on the Web site of a traffic producer, in accordance with the present invention.

In FIG. 6, the step of changing a URL on the Web site of a traffic producer 212 (step 14) is illustrated. In block 32, traffic producer 212 is provided with a URL of traffic quality intermediary 222 that includes the unique identifier assigned to the particular traffic consumer 210 URL. The URL of traffic quality intermediary 222 replaces the existing traffic consumer's URL. The purpose of adding urlid=123 (for the above example) to the end of the link of the traffic intermediary is to make it possible to retrieve the unique URL of a traffic consumer 210 when redirecting a user to the requested/selected traffic consumer 210. This practice is called parameterizing the URL. Traffic quality intermediary 222 may choose to add any number of extra parameters to its URL as it is being placed on a traffic producer Web site if it necessary for traffic information collecting purposes.

Traffic quality intermediary 222 may also be asked to modify the entire listing of a traffic consumer 210, and not just the traffic consumer's URL. Traffic quality intermediary 222 would do so, provided that all of the necessary information for the listing and to contact the traffic producer is provided. In block 34, the method and manner of listing a traffic consumer on a traffic producer Web site is defined. This could include the type of advertisement, the ranking of the advertisement, the number and location of the placement of the advertisement and the keywords associated with the advertisement/traffic consumer. Once a traffic consumer is registered, the number and manner of listings and/or URL's of the traffic consumer, can change as often as desired by the traffic consumer.

Finally, in block 36, the user traffic parameters of the request that will be used in determining traffic quality rankings for traffic consumer 210 are selected for the user traffic data sent to traffic quality intermediary 222 when a user clicks on the reference/listing. Configuring or selecting the user traffic data parameters allows the traffic consumer to identify which user traffic parameters are to be used and/or weighted in generating one or more traffic quality ranking. In an exemplary embodiment, the number of traffic quality parameters collected and stored from each user's traffic data is fixed. For those traffic quality parameters that are not being used by the traffic consumer, the weight of those parameters will be set to zero. In an alternative embodiment, additional traffic parameters are specified and used for a traffic consumer.

Traffic parameters include information available and communicated through the HyperText Transfer Protocol (HTTP). As the HTTP protocol evolves, it is feasible that some or all of the parameters may change or new ones may be added. A goal of the present system is to take advantage of all of the available parameters in the analysis, to the fullest extent needed for a particular analysis. Depending upon the particular traffic consumer, traffic producers and industries involved, fewer or greater numbers of the available user traffic data parameters may be relevant to the analysis. As mentioned earlier, additional information, unique to the particular Web user's selection of the traffic consumer listing on the traffic producer Web site may also be forwarded as user traffic data. Calculated/assigned traffic parameters, such as time and date information and click patterns, can be determined at the traffic quality intermediary. The parameters of user traffic data collected from the request include but are not limited to:

1. The time of the request. This is a recorded time of an actual click using standard time zones to identify peaks and valleys of normal Internet traffic levels. These peaks and valleys may be the result of normal user activities of sleeping, working, shopping or browsing, as well as exceptional circumstances, such as holidays and special events.
2. Referring URL. The referring URL identifies source of origin and is used for monitoring and filtering unwanted user traffic. Metrics about a referring URL including link popularity, average search engine ranking and reported monthly site visits can be used in assessing the value of a referring URL.
3. Keyword Phrases. Keyword phrases are the set of words which were searched by the user for or dynamically displayed based on content channels which determine the targetability of the traffic consumers listing.

Generally speaking, the more words within the set of keyword phrases, the greater the targetability.

4. Click Patterns. Click patterns refer to the similarity of keyword phrases being searched or clicked and the interval (period of time between clicks or between searching) of each keyword phase as it relates to other data recorded consistent with human behavior.
5. Browser Language. The browser language is the designation set within a Web browser that is part of the standard used in recording what language someone is viewing or information. This may reflect the country or origin of the user.
6. Internet Protocol (IP) Address. On a TCP/IP network, such as the Internet, the IP address is an assigned number that uniquely identifies each system on the network. Both the network and the computer are represented in the sequence that makes up the IP address. Each computer (or host) on the Internet has at least one IP address that uniquely identifies that computer from all other computers on the Internet. The IP address of the user allows the system to compare the frequency, geographical location, click patterns including keyword relevancy and other aspects like browser language to determine whether user traffic data collected logically corresponds to the known geographic region of the IP address.
7. Screen Settings. Screen setting generally known as resolution or dpi (dots per inch) identifies the screen settings of each user selecting a traffic consumer's Web site. It is possible to collect width, height, color, and depth information about Web user's screen.
8. X and Y Spatial Coordinates. The spatial coordinates correspond to the location within a screen (computer monitor) in which a user actually performs a click to access additional information from a button, text link, or other image form that identifies the traffic consumer Web site.
9. Proxy Usage. Proxy usage relates to whether a request had come through a named proxy. Proxy servers may be used by ISP's for protection of its users as a firewall. Traffic producers that send traffic containing a large percentage of proxy usage, however, are generally suspected of fraud since statistically, proxy-based traffic represents a low percentage of all Internet traffic. However some traffic producers such as America Online (AOL™) are entirely proxy-based so user traffic coming from them would be mostly proxy-based. Specific cases such as this must be taken into account when calculating the ranking values.
10. Cookies. Cookies are a set of small files stored within a user's computer relating to Web sites accessed by a user.
11. Browser type. The type and version of a browser.
12. Operating system. Language, browser type and the operating system are part of the user agent parameter of the request. The diversity of values of this parameter may serve as an indication that the traffic is not simulated.
13. Click Delay. The time between a search request and an actual click by a user on a link found in the set of results displayed. A Click delay that is less than 1 second reflects abnormal human behavior found with click programs. Too long of a delay may mean some other form of non-industry accepted type of traffic.

Additional traffic parameters available through HTTP, calculated/assigned following a user click or other ways can be used as deemed necessary to assist in determining a traffic quality ranking of user traffic.

Figure 7:
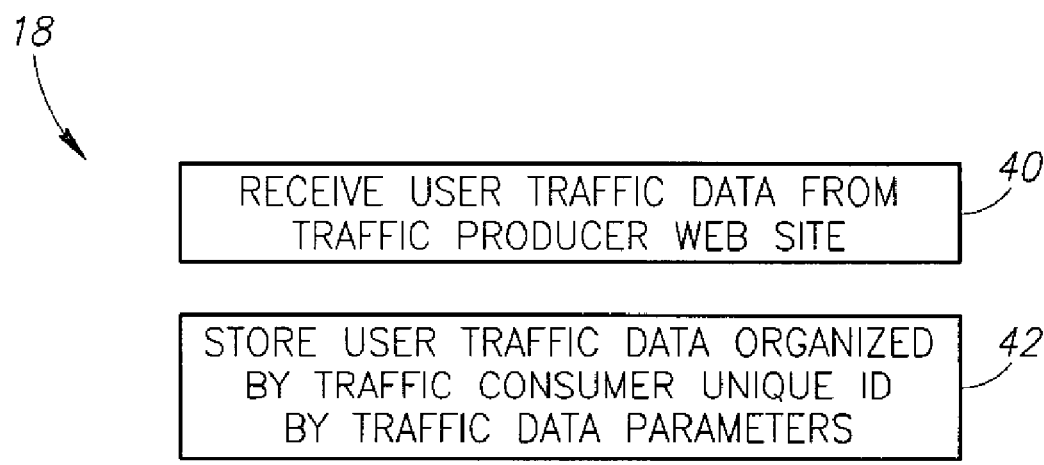
FIG. 7 is a flow diagram of exemplary steps of receiving and storing user traffic data, in accordance with the present invention.

FIG. 7 shows the steps involved in receiving and storing user traffic (step 18). In block 40 user traffic data is received at traffic quality intermediary 222 from the Web site of a traffic producer 212. In block 42 the user traffic data is stored in database 226 in association with the selected traffic consumer 210 so that the user traffic data can be analyzed and a traffic quality ranking determined. In an exemplary embodiment, when the request is received from a traffic producer 212 Web site at a traffic quality intermediary 222 Web server, the request will arrive at a Java™ server page (JSP) or another vehicle designated to receive HTTP requests. The JSP then extracts all of the available user traffic data from the request and stores it in database 226. The traffic producer's URL is retrieved based on the unique ID that was included with the URL of traffic quality intermediary 222. The user is then redirected to the desired Web site of traffic consumer 210.

In an exemplary embodiment, the user traffic data stored in database 226 is organized as a table or in multiple tables for analysis and reporting. In this table (or tables), a row is set up for the user traffic data that is transmitted with each user/click. In another table or tables, traffic consumer parameters are stored. Each column of the table is organized by the specific user traffic parameters. The table is then populated with user traffic data for additional users/clicks that were directed to traffic quality intermediary 222 from a traffic producer 212.

An example of a table (Clicks Table 1) populated with fictional user traffic data broken down by parameters is as follows: traffic data parameter is set. The baseline value can be a number, a number within a range, a number within a defined set, a percentage, a Boolean value or other numeric represen user traffic data against stored baseline values for each parameter of user traffic data. In block 44, a baseline value for each tation of a "value" for a parameter's baseline. The baseline value may be arrived at from a history of collected data or a subjective assessment of each traffic data parameter. The baseline value may differ from traffic producer to traffic pro-

TABLE 1

Clicks

| userIP | Referrer URL | User Agent | Language | time | proxy |
|---|---|---|---|---|---|
| 111.111.222.222 | http://www.traffic-producer1.com | Netscape, Win 98 | en_us | Feb. 26, 2003 11:04 111 pm | AOL |
| 111.111.222.223 | http://www.traffic-producer1.com | Netscape, Win XP | en_ca | Feb. 26, 2003 11:04 123 pm | |
| 111.111.222.224 | http://www.traffic-producer1.com | ME, Win 95 | en_gb | Feb. 26, 2003 11:04 334 pm | |

In this exemplary clicks table, six fields of user traffic parameters (columns) and three individual clicks (rows) of user traffic data are shown. After a set period of time or a set number of clicks, user traffic data is aggregated (block 45, FIG. 8) as part of the analysis process. The User Agent field includes browser type, browser version, operating system and operating system version. This information could also be broken down into separate fields in an alternative embodiment.

The following Aggregated Data Table 2 shows an example of user traffic data aggregated from a fictional ten thousand users (clicks):

ducer or from industry to industry. Baseline representation is not limited to any particular implementation.

In block 45, the user traffic data is aggregated over a period of time or multiple clicks/users. While the system and method of the present invention can provide a quality ranking based upon the user traffic data of a single user, it is likely that a traffic consumer will obtain better information regarding user traffic based upon multiple users. Thus, in most if not all cases, it is likely that the user traffic data will be aggregated.

In block 46, each traffic data parameter from the user traffic data is compared against the corresponding baseline value to determine a deviation value. The deviation value is the dif-

TABLE 2

Aggregated Data

| % unique user Agents | % US English | % English | % proxy | % unique IP | % US IP | % Europe IP | % Asia-Pacific IP | % Latin America IP | % black listed IP | time range (millsec) |
|---|---|---|---|---|---|---|---|---|---|---|
| 40 | 70 | 80 | 20 | 50 | 80 | 10 | 2 | 2 | 10 | 7,200,000 |

For this aggregated data table, the percentages of each user traffic data parameter or subset within a parameter are listed. The Black Listed IP field pertains to IP addresses that are black listed or otherwise tagged as special. This may be from an internal list of traffic quality intermediary 222, an external list or a combination of the two. The time range is the time period over which the data set was collected. In this example, it is the time period over which the ten thousand entries was collected—7,200,000 milliseconds or two hours. This is another item of calculated/assigned traffic data. The percent of unique user agents is calculated as illustrated in the following example. If in a set of 10 entries there were 5 unique entries, the set exhibits 50% uniqueness. High uniqueness shows better breakdown of data and implies that it is not computer generated.

There is shown in FIG. 8 a flow diagram for determining the quality ranking of user traffic (block 22) by comparing ference between actual user traffic data for a particular parameter and the baseline value. The rules for determining a deviation may depend upon the type of value being used for a particular parameter. For example if the browser language parameter is being analyzed, a percentage of users using certain languages over a period of time (or number of users) may be the best way to represent the number of users using English, Spanish, etc. For each time period (or number of users) where a determination is being made, the percentage of users of a particular language aggregated over the time period (or number of users) is determined and compared against the baseline. The deviation is then the difference between the baseline and the actual. One traffic consumer may want to use the percentage of English users as the baseline, while another may chose to use the percentage of Spanish users. Still another may use a baseline that includes the additive percentage of English and Spanish users (or other languages or combination of languages) in conducting traffic analysis.

The following is an example of an industry baseline table for sports producers. The percentages will be used as a reference to compare the percentages of the collected user traffic data. The data below is fictitious, for purposes of illustration. The actual baseline is determined by observation of patterns of various parameters within an industry of interest for a reasonable amount of time or number of clicks. A time range column is not shown on this baseline table.

In order to maintain proper baseline weightings, the baseline values should be regularly compared against the actual user traffic data and calculated deviations. In an exemplary embodiment, similar patterns of the baselines are adjusted continually to reflect changes in traffic and 80% of averaged data are taken into account when adjusting the baseline. About 20% of traffic data exhibiting extreme deviations is disregarded so as to not to skew the baseline with abnormal readings. In other implementations, other methods may be used to keep the baseline in line with the changing conditions on the Web.

There are Web sites or services that offer ranking data for the various Web sites and that ranking data can be used to estimate expected traffic activity for each Web site per time period. An example is the Alexa™ ranking available at www.alexa.com. This data can be used to determine the deviation of the traffic activity in the sample data set from estimated values. This parameter of the baseline is helpful because if the ranking indicates fairly low traffic activity and the actual collected data shows much higher activity pattern, it may indicate that data was computer generated. Expected activity amount is not shown on the table below.

Depending on the target audience of a traffic producer's Web site, time activity pattern may be visible that demonstrates the activity patterns of the Web site visitors. For example, US-based traffic consumers may tend to show the highest activity at 3pm and the lowest at 5am. This is another useful parameter of the baseline. Observed time activity pattern is graphed against the expected activity time pattern to show any deviations that may exist. For example, if a US-based Web site shows an even time activity pattern, it may serve as an indication that no actual Web users are creating time activity. Time activity pattern is not shown on the exemplary Sports Baseline Table 3, below.

benefit from expressing the results in specific meaningful/compatible units. In an exemplary embodiment of the present invention, deviations are normalized because some deviation values may have wide ranges and may be disproportionate to the other deviation values. Without normalization, the resulting quality ranking could be skewed and unreliable. Normalization allows overcoming the vast differences that may exist between the deviations for individual parameters to enable to view all the parameters from an equal perspective. For example, if the baseline for Chinese language on the US-based educational Web site is 0.5% and actual values come up to be 80% the deviation is 16,000%. In an exemplary embodiment, normalization is accomplished by setting up specific ranges for each baseline parameter and assigning a different value to each range.

An example of a Normalization Table 4 for one of the user traffic data parameters—% unique user agents—is shown below:

TABLE 4

| Normalization | | | |
| --- | --- | --- | --- |
| Field | deviation % start | deviation % end | points |
| % unique userAgents | 0 | 5 | 100 |
| % unique userAgents | 6 | 10 | 80 |
| % unique userAgents | 11 | 20 | 50 |
| % unique userAgents | 21 | 50 | 30 |
| % unique userAgents | 51 | 75 | 20 |
| % unique userAgents | 76 | 95 | 5 |
| % unique userAgents | 95 | 100 or > | 0 |

In this normalization table, ranges are set up for the start and ending points of the deviations determined by comparing the collected data against the baseline data. In Normalization Table 4, seven ranges are established. Points are assigned based on where the deviation determined against the baseline.

TABLE 3

| Sports Baseline | | | | | | | | | |
| --- | --- | --- | --- | --- | --- | --- | --- | --- | --- |
| % unique userAgents | % US English | % English | % proxy | % unique IP | % US IP | % Europe IP | % Asia-Pacific IP | % Latin America IP | % black listed IP |
| 80 | 75 | 80 | 5 | 70 | 80 | 3 | 1 | 0 | 0 |

In an exemplary embodiment, once the deviations are determined, the deviation values are normalized in block 47. Normalization is the adjustment of a series of values according to some transformation function in order to make them comparable with some specific point of reference or number range. Normalization is often used and sometimes required when the incompatibility of the measurement units across variables may affect the results or when a final report could For this example, points are awarded between 0 (greatest deviation) and 100+ (smallest deviation). Thus if the deviation % is zero, 100 points are assigned. If the deviation % is 100%, 0 points are assigned. Other scales or ranges could be used, depending upon the application. Using the examples above, 40% of the collected data was from unique user agents compared to a baseline or expected value of 80%. This results in a determination that the collected data has a deviation of 50% (40% is 50% of 80%) from the baseline data. Using the Normalization table, a deviation of 30 points is found, since the determined deviation of 50% is between 21% and 50%. Similar determinations are made for each user traffic data parameter. The normalization tables and scales will usually be different for each parameter.

Next, the normalized deviations are calculated for all of the other parameters for which normalization is determined, to generate a Normalized Deviations Table 5, an example of which is shown below:

TABLE 5

Normalized Deviations

| User Agents | US English | English | Proxy | Unique IP | US IP | Europe IP | Asia-Pacific IP | Latin America IP | Black listed IP** | time range (millsec) | activity curve |
|---|---|---|---|---|---|---|---|---|---|---|---|
| 30 | 90 | 100 | 95 | 70 | 100 | 90 | 90 | 90 | 10 | 100 | 70 |

In block 48, a weight for each traffic data parameter is set. Weights for particular traffic data parameters may be set differently and vary from one traffic consumer to another. It may be that a single parameter is determinative of the overall quality ranking, based on the weight assigned to that parameter. Conversely, a parameter may have little or no bearing on the traffic quality ranking, based upon the weight assigned to it. Weights can also be adjusted over time to more accurately provide a user traffic quality ranking. In an exemplary embodiment, weights are initially set based on the objective information determined by traffic quality intermediary 222 by collecting and analyzing the user traffic for a time period. In and exemplary embodiment, the last three years are used as the time period. In initially implementing the present invention, weights could initially be set to be the same for every parameter and gradually shifted by observing the significance of every parameter in the determination of the traffic quality over time.

After the normalized deviations table is generated, the values are weighted, using weights stored in a weights table, such as the Sports Traffic Consumer Weights Table 6 below:

The weights used for a particular traffic producer may be shifted based on additional information that may be available. For example, if AOL™ is being evaluated as a traffic producer, its proxy values would be much higher than expected based on the baselines, given the fact that all of its traffic is proxy-based. Thus, in this case proxy weight might be set to 0 and all of the other parameters increased equally. The weights may also be adjusted over time by the traffic consumer and/or the traffic quality intermediary to arrive at useful and accurate traffic quality rankings.

In step 50 the normalized deviation value determined in block 47 is multiplied by the baseline weight set in block 48 to determine a quality ranking for each traffic data parameter. Then, in block 52 the rankings for each traffic data parameter are added to determine a total quality ranking for user traffic for a particular traffic producer. Once weights are established for each parameter, the weights for each parameter are multiplied by the corresponding normalized deviation value. The weighted, normalized deviation values are then added together to arrive at a final quality ranking for a particular traffic producer. This is shown in the following Final Ranking Table 7 as a final user traffic quality ranking of 7365 (on the scale from 0 to 10,000):

TABLE 6

Sports Traffic Consumer Weights

| User Agents | US English | English | Proxy | Unique IP | US IP | Europe IP | Asia-Pacific IP | Latin America IP | Black listed IP** | time range (millsec) | activity curve |
|---|---|---|---|---|---|---|---|---|---|---|---|
| 5 | 0 | 10 | 20 | 40 | 0 | 0 | 0 | 0 | 15 | 5 | 5 |

TABLE 7

Final Ranking

| | User Agents | US English | English | Proxy | Unique IP | US IP | Europe IP | Asia-Pacific IP | Latin America IP | Black listed IP | time range (millsec) | activity curve |
|---|---|---|---|---|---|---|---|---|---|---|---|---|
| weights | 5 | 0 | 10 | 20 | 40 | 0 | 0 | 0 | 0 | 15 | 5 | 5 |
| deviation values | 30 | 90 | 100 | 95 | 70 | 100 | 90 | 90 | 90 | 10 | 100 | 0 |
| weights * values | 150 | 0 | 1000 | 1900 | 2800 | 0 | 0 | 0 | 0 | 150 | 500 | 0 |
| ranking | 7365 | | | | | | | | | | | |

In an exemplary embodiment, a traffic quality ranking is determined for a number of users over a period of time. In such a system, the deviations are determined after the user traffic data is aggregated for all users within the predetermined time frame for collecting data. A software routine is triggered at set intervals of time or number of users/clicks for whom user traffic data has been stored. For example, if hourly data is desired, user traffic data stored in database 226 for the preceding hour will be accessed each hour. Each hour, the user traffic data for each user traffic producer will be aggregated for use in determining deviations from the baseline values. The total for each user traffic data producer will then be normalized. Following normalization, the normalized data will then be compared against the baseline value for that particular producer to determine if there is any deviation. If a quality ranking is being determined against a general baseline, an industry baseline, and a specific baseline for a consumer Web site, the deviations are determined against each of these three different baseline values and stored separately.

In an exemplary embodiment, the top ranking is set to be 10,000. Regardless of the number of parameters involved and the respective weights applied to them, the total ranking cannot exceed 10,000. For example, one parameter with 100 points multiplied by a weight of 100=10,000. Two parameters with 100 points multiplied by weights of 50 and combined: 100*50+100*50=10,000. In other embodiments a different top ranking value can be set. Finally, the method for combination of data from each parameter may differ from the exemplary embodiment of adding the weighted normalized deviation values together.

Quality rankings can be determined over any period of time such as an hour, a day, week or month. Alternatively, instead of averaging the user traffic data parameters over a given period of time, the user quality rankings determined for a particular interval can be aggregated over a larger period of time. In this way, user traffic quality rankings for each hour can be averaged over a day, week, month, etc.

In reporting quality ranking to traffic consumers, a graphical display will be provided of all aggregate parameter deviations for each producer as well as the weightings applied to each of the parameters. Final rankings and numbers will be shown as well. General, industry and specific traffic producer ranking figures will be shown. Traffic consumers will be able to view the historical data for the industry, as well as the particular traffic producers. The traffic consumer will be able to adjust the weights to arrive at quality ranking figures that may be more appropriate for their line of business angle. To further evaluate the data, a traffic consumer will be able to supply dollar amounts spent on listing with each traffic producer to determine the overall effectiveness of each traffic producer.

Visual interface may use colors to make it easier for the traffic consumer to see the difference in rankings. Thus, high rankings would be shown in green and low ranking in red. Shadings will be used to demonstrate the strength of the particular ranking. Bright red may indicate very low ranking. Bright green may indicate very high ranking. Individual deviations may also use colors to make it easy for the traffic consumers to immediately spot the trouble areas of their traffic.

In an alternative embodiment, the present invention can also be used in evaluating actual business or money spent by users referred from a traffic producer to a traffic consumer. For this embodiment, the traffic consumer would provide data regarding how much was spent, when it was spent and similar information to traffic quality intermediary 222. A correlation can be made regarding the amount spent and the number of clicks per time period and the traffic quality ranking.

Two useful measurements may help the traffic consumer to put a value on the advertising campaign:

Value For Dollar: (Total Clicks * Rankings)/(Total Rankings * Dollars Spent)
Cost Per Value: (Total Rankings * Dollars Spent)/(Total Clicks * Rankings)

For example, a Traffic Producer Value Table 8 is shown below:

TABLE 8

Traffic Producer Value

| Producer Name | Total Clicks Sent Per 24 hours | Ranking | Amount Spent | Value For Dollar | Cost Per Value |
|---|---|---|---|---|---|
| Producer1 | 1000 | 8000 | $200 | 4 | 0.25 |
| Producer2 | 1000 | 9000 | $200 | 5 | 0.222 |

This table compares two traffic producer, each producing 1000 users (clicks) in a 24-hour period. The first (Producer1) has a traffic quality ranking of 8000 and the second (Producer2) has a traffic quality ranking of 9000. These traffic quality rankings were previously determined. Users from each traffic producer spent a total of $200 at the traffic consumer during the 24-hour period. In the last two columns the traffic consumer would be able to see that advertising with traffic Producer2 may yield better value at lower cost than Producer1.

In the next Traffic Producer Value Table 9, the traffic producers direct users spending the same dollar amounts at the traffic consumer, but with different amounts of user traffic directed over the 24-hour period.

TABLE 9

| | Traffic Producer Value | | | | |
|---|---|---|---|---|---|
| Producer Name | Total Clicks Sent per 24 hours | Ranking | Amount Spent | Value For Dollar | Cost Per Value |
| Producer3 | 200 | 10000 | $100 | 2 | 0.5 |
| Producer4 | 1000 | 8000 | $100 | 8 | 0.125 |

Based on the data above the traffic consumer might be able to reach some important conclusions. It appears that user traffic from Producer4 is cheaper and of a lower ranking. Producer4, however, offers a higher value per dollar and costs less due to the fact that the total number of clicks sent is so high. In other words even if Producer3 sends a higher quality of traffic to a traffic consumer, Producer4 sends much more traffic that ultimately results in more of Producer4 users buying into the products the traffic consumer may be advertising. It may seem counterintuitive, but at a certain point, a high amount of inexpensive and lower quality traffic from Producer4 may actually mean better results for the traffic consumer. Under other scenarios, the higher quality traffic producer may provide the better value to a traffic consumer.

In the next example, the ranking of traffic Producer6 is much lower than that of Producer5. It is possible to see that with such a low ranking, traffic Producer6 may not be able to deliver as much high value at a lower cost as Producer5.

TABLE 10

| | Traffic Producer Value | | | | |
|---|---|---|---|---|---|
| Producer Name | Total Clicks Sent per 24 hours | Ranking | Amount Spent | Value For Dollar | Cost Per Value |
| Producer5 | 200 | 10000 | $100 | 2 | 0.5 |
| Producer6 | 8000 | 2000 | $100 | 1.6 | 0.625 |

Putting in the amounts spent may help the traffic consumer make necessary adjustments in the weights for the traffic parameters to better represent their business model. For example, if the traffic consumer is US-based business and knows that traffic producers being evaluated are strictly US-based as well, traffic consumer may set the weight of US-based English to 10 and weight of English to 0 to better access the US-based Web users coming from the traffic consumers.

In an alternative embodiment, traffic data collected from each user's request could be supplemented with traffic data collected when a traffic consumer's listing is displayed on a traffic producer's Web site.

For example, software code capable of being interpreted and executed by a user's browser can be embedded in a traffic consumer's listing (reference). When this listing is requested from the traffic producer's Web site by the Web user, the embedded code will be invoked by the Web user's browser to collect additional information about the traffic producer and the Web user. A request for the listing may be in the form of a request for a results list from a search initiated by a user on a traffic producer Web site, such as a search engine. The embedded code is triggered by the internal mechanism of the user's browser and may be executed on the traffic quality intermediary Web site. Once triggered, the embedded code can act as a probe (probe code or tracking software code) to collect some or all of the available traffic parameters relating to the origin of the Web user request. This allows the traffic quality intermediary to collect information about a traffic producer even before a Web user actually clicks on a traffic consumer's listing. Traffic parameters collected through the triggered, embedded code can be the same, but are not limited to the set collected after a Web user clicks on a traffic consumer's link.

In an exemplary embodiment, JavaScript scripting language could be used to create the probe code. Probe code would be small enough so as not to significantly affect the traffic producer's Internet bandwidth usage. A traffic consumer's listing may be modified to include the script to call the code. Modification of a traffic consumer's listing would not be visible to the Web user because the probe code would be included in the special tags only viewed (interpreted) by the browser. The following is an example of embedded code:

<script src="http://TrafficQualityIntermediary.com/ref.js-p?listingID=152"></script>

Script tags signal to the browser not to display the content within the script tags to the Web user, and to execute a request to the referenced traffic quality intermediary Web site. The traffic quality intermediary completes the request and collects traffic parameters from the traffic producer. It is a similar action to the one that occurs when a Web user clicks on a listing and gets redirected to the traffic quality intermediary before reaching the Web site of the selected listing.

Collection of this information is helpful in determining whether the Web user came to a traffic producer from another Web site or if script or some other artificial means is used to simulate Web users coming to a traffic producer's Web site.

Figure 9:
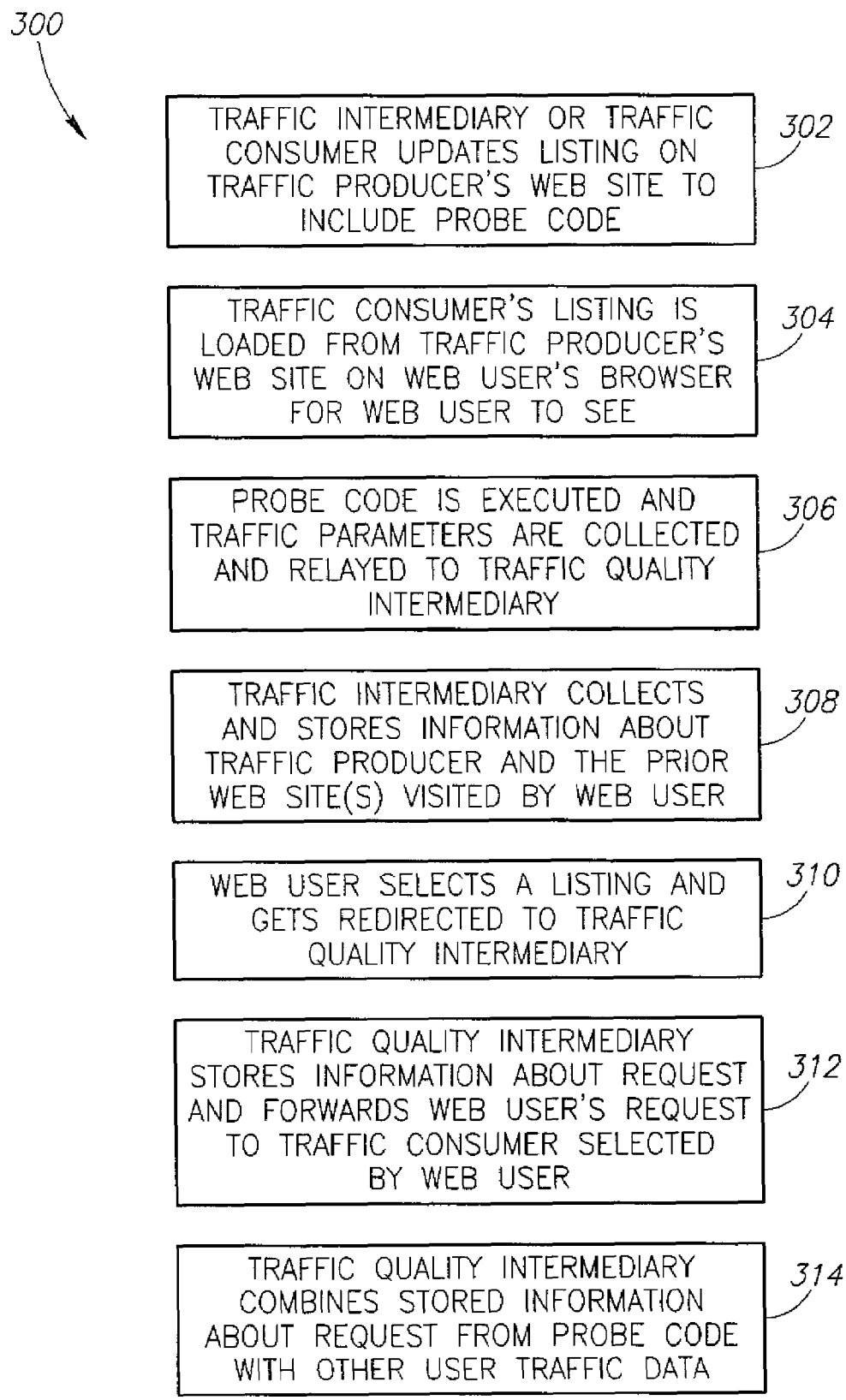
FIG. 9 is a flow diagram of exemplary steps for providing probe code to obtain additional user traffic data.

FIG. 9 shows a flow diagram of process 300. Process 300 is the process of probe code collecting available information from a traffic producer's Web site as a traffic consumer's listing is displayed to the Web user.

In block 302 a traffic quality intermediary or traffic consumer updates one or more listings on the traffic producer's Web site to include probe code. In an exemplary embodiment, this probe code is written in JavaScript.

In block 304 the traffic consumer's listing is loaded on the Web user's browser for the Web user to see.

In block 306 the parameterized code is executed. Traffic parameters are collected and relayed to traffic quality intermediary.

In block 308 the traffic quality intermediary collects information about the Traffic producer and the prior Web site.

In block 310 the Web user clicks on a listing and gets redirected to the traffic intermediary.

In block 312 the traffic intermediary stores information about the request and forwards the Web user's request to the appropriate traffic consumer.

In Block 314 the information obtained from the probe code is (optionally) combined with other user traffic information obtained for the particular Web user. If information from the probe code was executed prior to the traffic request from the Web user was available, it would be joined to the respective information collected from the Web user request when that information is received. It may be that all user traffic information is obtained through the probe code. By combining all available user traffic information (obtained through probe code or otherwise) a more complete picture of the Web user's behavior on the traffic producer's Web site can be obtained.

For example, a traffic quality intermediary might be able to determine what other Web site the Web user came from before visiting traffic producer's Web site (prior Web site). The prior Web site may already have been analyzed by the system and method of the present invention described above and the prior Web site ranking may be yet another parameter collected and used in the analysis of the given traffic producer. Traffic data relating to prior Web site visits by a user is referred to as prior Web site traffic data.

If no information about the prior Web site is available within the traffic quality intermediary's domain, it is possible to determine if the Web user came from an actual Web site or if fraudulent code or other means was used to simulate the Web user actions.

For example, if probe code was inserted in the traffic consumer's listing on the traffic producer's Web site, and user traffic was flowing from the traffic producer's Web site, but the probe code never executed, it may indicate that the traffic producer is simulating user traffic. This finding would have to be evaluated further to validate that the Web user did not have interpretation and execution of scripts disabled on their browser. Typically, JavaScript is enabled on a Web user's browsers. If JavaScript probe code was never executed with any of the Web users in the user traffic stream, it is an indication that the traffic producer may have been generating fictitious traffic. Other indications, or trends could be determined based on information obtained using the probe code.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of determining a quality ranking of user traffic directed from at least one traffic producer Web site to a plurality of traffic consumer Web sites, comprising the steps of:
   a) establishing a plurality of references for the plurality of traffic consumers on the at least one Web site of the traffic producer, the plurality of references each including a link from the traffic producer to a traffic quality intermediary and a unique identifier to identify a respective traffic consumer from other traffic consumers of the plurality of traffic consumers;
   b) receiving, at the traffic quality intermediary, user traffic data associated with the user traffic directed from the traffic producer;
   c) directing, using a respective link, the user traffic through the traffic quality intermediary from the at least one traffic producer Web site to one or more of the plurality of traffic consumer Web sites;
   d) determining, at the traffic quality intermediary, a quality ranking of the user traffic of each of the traffic consumers based upon the user traffic data received by the traffic quality intermediary and the unique identifier of the respective traffic consumer comprising the steps of:
      i) comparing each of a plurality of traffic data parameters of the user traffic data against a baseline group, the baseline group comprising a respective baseline for each of the plurality of traffic data parameters of the user,
      ii) determining a deviation for each of the plurality of traffic data parameters of the user traffic data based on the comparison,
      iii) weighting the deviation for each of the plurality of traffic data parameters of the user with a predetermined weight assigned to each of the plurality of traffic data parameters of the user, and
      iv) combining each of the weighted deviations to arrive at the traffic quality ranking of the respective traffic consumer; and
   e) reporting the quality ranking of the respective traffic consumer.

2. A method of determining a quality ranking of user traffic directed from at least one traffic producer Web site to a plurality of traffic consumer Web sites, comprising the steps of:
   a) establishing a plurality of references for the plurality of traffic consumers on the at least one Web site of the traffic producer, the plurality of references each including a link from the traffic producer to a traffic quality intermediary and a unique identifier to identify a respective traffic consumer from other traffic consumers of the plurality of traffic consumers;
   b) receiving, at the traffic quality intermediary, user traffic data associated with the user traffic directed from the traffic producer, the user traffic data comprised of a plurality of traffic data parameters;
   c) directing, using the respective link, the user traffic through the traffic quality intermediary from the at least one traffic producer Web site to one or more of the plurality of traffic consumer Web sites;
   d) determining, at the traffic quality intermediary, a quality ranking of the user traffic of the respective traffic consumer based upon the user traffic data received by the traffic quality intermediary and the unique identifier of the respective traffic consumer comprising the steps of:
      i) aggregating at least one traffic data parameter of the user traffic data,
      ii) comparing each of the plurality of traffic data parameters of the aggregated user traffic data against a baseline group, the baseline group comprising a respective baseline for each of the user traffic data parameters,
      iii) determining a deviation for each of the plurality of traffic data parameters of the user traffic data based on the comparison,
      iv) normalizing the determined deviation for at least one of the plurality of traffic data parameters of the user traffic data,
      v) weighting the deviation for each of the plurality of traffic data parameters with a predetermined weight assigned to each of the plurality of traffic data parameters and if a deviation is normalized, using the normalized deviation for the weighting, and vi) combining each of the weighted deviations to arrive at the traffic quality ranking of the respective traffic consumer; and e) reporting the quality ranking of the respective traffic consumer.

3. A method of determining a quality ranking of user traffic associated with a plurality of users, each user directed from a traffic producer Web site to a plurality of traffic consumer Web sites, comprising the steps of:

a) establishing a plurality of references for the plurality of traffic consumers on the traffic producer Web site, the plurality of references each including a link from the traffic producer to a traffic quality intermediary and a unique identifier to identify a respective traffic consumer from other traffic consumers of the plurality of traffic consumers;

b) receiving, at the traffic quality intermediary user traffic data associated with each user of the user traffic directed from the traffic producer, the user traffic data for each user comprised of a plurality of traffic data parameters;

c) directing, using a respective link, the user traffic through the traffic quality intermediary from the traffic producer Web site to one or more of the plurality of traffic consumer Web sites;

d) determining, at the traffic quality intermediary, a quality ranking of the user traffic of each of the traffic consumers based upon the user traffic data received by the traffic quality intermediary and the unique identifier of the respective traffic consumer comprising the steps of:

i) aggregating the user traffic data for each traffic data parameter, ii) comparing each of the plurality of traffic data parameters of the aggregated user traffic data against a baseline group, the baseline group comprising a respective baseline for each of the user traffic data parameters, iii) determining a deviation for each of the plurality of traffic data parameters of the user traffic data based on the comparison, iv) normalizing the determined deviation for at least one of the plurality of traffic data parameters of the user traffic data, v) weighting the normalized deviation for each of the plurality of traffic data parameters with a predetermined weight assigned to each of the plurality of traffic data parameters, and vi) combining each of the weighted deviations to arrive at the traffic quality ranking of the respective traffic consumer; and e) reporting the quality ranking of the respective traffic consumer.

4. A system of determining a quality ranking of user traffic directed from at least one traffic producer Web site to traffic consumer Web sites, comprising:

a) means for establishing references for the traffic consumers on the at least one Web site of the traffic producer, the respective one or ones of references each including a link from the traffic producer to a traffic quality intermediary and a unique identifier to identify a respective traffic consumer from other traffic consumers of the traffic consumers;

b) at least one computer for receiving at the traffic quality intermediary user traffic data associated with the user traffic directed from the traffic producer;

c) means for directing, using a respective link, the user traffic through the traffic quality intermediary from the at least one traffic producer Web site to one or more of the traffic consumer Web sites;

d) at least one computer for determining, at the traffic quality intermediary, a quality ranking of the user traffic of the respective traffic consumer based upon the user traffic data and a corresponding unique identifier of the respective traffic consumer that carries out the steps of:

i. comparing each of a plurality of traffic data parameters of the user traffic data against a baseline group, the baseline group comprising a respective baseline for each of the plurality of traffic data parameters of the user, ii. determining a deviation for each of the plurality of traffic data parameters of the user traffic data based on the comparison, iii. weighting the deviation for each of the plurality of traffic data parameters of the user with a predetermined weight assigned to each of the plurality of traffic data parameters of the user, and iv. combining each of the weighted deviations to arrive at the traffic quality ranking of the respective traffic consumer; and e) means for reporting the quality ranking of the respective traffic consumer.

5. A system for determining a quality ranking of user traffic directed from at least one traffic producer Web site to a plurality of traffic consumer Web sites, comprising:

a) means for establishing a plurality of references for the plurality of traffic consumers on the at least one Web site of the traffic producer, the plurality of references each including a link from the traffic producer to a traffic quality intermediary and a unique identifier to identify a respective traffic consumer from other traffic consumers of the plurality of traffic consumers;

b) at least one computer for receiving at the traffic quality intermediary user traffic data associated with the user traffic directed from the traffic producer, the user traffic data comprised of a plurality of traffic data parameters;

c) means for directing, using a respective link, the user traffic through the traffic quality intermediary from the traffic producer Web site to the plurality of traffic consumer Web sites;

d) at least one computer for determining, at the traffic quality intermediary, a quality ranking of the user traffic of each of the traffic consumers based upon the user traffic data received and the unique identifier of the respective traffic consumer that carries out the steps of:

i) aggregating at least one traffic data parameter of the user traffic data, ii) comparing each of the plurality of traffic data parameters of the aggregated user traffic data against a baseline group, the baseline group comprising a respective baseline for each of the user traffic data parameters, iii) determining a deviation for each of the plurality of traffic data parameters of the user traffic data based on the comparison, iv) weighting the deviation for each of the plurality of traffic data parameters with a predetermined weight assigned to each of the plurality of traffic data parameters, and v) combining each of the weighted deviations to arrive at the traffic quality ranking of the respective traffic consumer; and e) means for reporting the quality ranking of the respective traffic consumer.

6. A system for determining a quality ranking of user traffic directed from at least one traffic producer Web site to a plurality of traffic consumer Web sites, comprising:

a) means for establishing a plurality of references for the plurality of traffic consumers on the at least one Web site of the traffic producer, the plurality of references each including a link from the traffic producer to a traffic quality intermediary and a unique identifier to identify a respective traffic consumer from other traffic consumers of the plurality of traffic consumers;

b) at least one computer for receiving at the traffic quality intermediary user traffic data associated with the user traffic directed from the traffic producer, the user traffic data comprised of a plurality of traffic data parameters;

c) means for directing, using a respective link, the user traffic through the traffic quality intermediary from the traffic producer Web site to the plurality of traffic consumer Web sites;

d) at least one computer for determining a quality ranking of the user traffic based upon the user traffic data and the unique identifier of the respective traffic consumer that carries out the steps of:

i) aggregating at least one traffic data parameter of the user traffic data, ii) comparing each of the plurality of traffic data parameters of the aggregated user traffic data against a baseline group, the baseline group comprising a respective baseline for each of the user traffic data parameters, iii) determining a deviation for each of the plurality of traffic data parameters of the user traffic data based on the comparison, iv) normalizing the determined deviation for at least one of the plurality of traffic data parameters of the user traffic data, v) weighting the deviation for each of the plurality of traffic data parameters with a predetermined weight assigned to each of the plurality of traffic data parameters and if the deviation is normalized, using the normalized deviation for the weighting, and vi) combining each of the weighted deviations to arrive at the traffic quality ranking of the respective traffic consumer; and e) reporting the quality ranking of the respective traffic consumer.

\* \* \* \* \*

UNITED STATES PATENT AND TRADEMARK OFFICE
CERTIFICATE OF CORRECTION

PATENT NO. : 7,649,838 B2  Page 1 of 1
APPLICATION NO. : 10/801199
DATED : January 19, 2010
INVENTOR(S) : Fishteyn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Twenty-eighth Day of December, 2010

David J. Kappos
*Director of the United States Patent and Trademark Office*